United States Patent [19]

Kashio

[11] 4,064,553

[45] Dec. 20, 1977

[54] INFORMATION PROCESSOR

[75] Inventor: Toshio Kashio, Tokyo, Japan

[73] Assignee: Casio Computer Co., Ltd., Tokyo, Japan

[21] Appl. No.: 631,907

[22] Filed: Nov. 14, 1975

[30] Foreign Application Priority Data

Nov. 15, 1974 Japan .............................. 49-131644

[51] Int. Cl.² ........................................................ G06F 13/00
[52] U.S. Cl. .................................................................. 364/200
[58] Field of Search ........................ 340/172.5; 364/200

[56] References Cited

U.S. PATENT DOCUMENTS

| 3,725,870 | 4/1973 | Felcheck et al. | 340/172.5 |
| 3,772,657 | 11/1973 | Marsalka et al. | 340/172.5 |
| 3,774,156 | 11/1973 | Marsalka et al. | 340/172.5 |
| 3,949,369 | 4/1976 | Churchill, Jr. | 340/172.5 |
| 4,024,503 | 5/1977 | Mercurio et al. | 340/172.5 |

Primary Examiner—Gareth D. Shaw
Assistant Examiner—C. J. Bartz
Attorney, Agent, or Firm—Flynn & Frishauf

[57] ABSTRACT

An information processor functions to continuously and successively read out from an external memory a plurality of records each consisting of a plurality of words, extract a record whose specified word used as a key word corresponds to the designated condition and store the record in a main memory and is characterized in that it comprises an address memory for successively writing each record in the main memory and receiving and storing an address data each time the heading address of each record is written in and a means for returning the address of the main memory to the heading address stored in the address memory when the result of the collation between the designated key word of the record written in the main memory and a prescribed condition proves that the key word does not correspond to the condition.

4 Claims, 2 Drawing Figures

INFORMATION PROCESSOR

BACKGROUND OF THE INVENTION

This invention relates to an information processor which functions to continuously read out a plurality of records in consecutive order from an external memory, selectively extract required record or required word in the record and store the extracted records or words in a main memory.

In processing records consisting of a plurality of words by means of an electronic computer or the like, a number of records are successively stored in a memory such as a disc, drum, tape, the required record is selectively read out from the memory and the record is processed. That is, the records stored in a memory and constituted by words representing the date of issue of a slip, a person in charge, customer code, name code of a person in charge, article code, quantity, a unit cost, total amount of money and the like are read out in consecutive order, the required records or required words in the required record are selectively extracted and concentrately stored in a specified memory. To determine the required record, a specified word in record is designated as a key word according to the content to be processed such as writing-out of debit notes for each customer, lists of the proceeds for each person in charge or the like and check is made to see that the content of the record corresponds to the condition of the required record. Therefore, in the step of successively reading out the record from the memory, it is not determined whether or not the record to be read out next is the record required for the data process and it is not determined until the key word is supplied. For this reason, the record is read out so that its key word can be collated, and then if the record is proved to the required one, the record must be read out again.

Thus, it needs much time to select and read out the required record and a circuit used for this purpose is complicated in construction.

SUMMARY OF THE INVENTION

It is an object of this invention to provide an information processor which functions to continuously read out a plurality of records in consecutive order from an external memory and selectively store a required in a main memory without reading out the required record twice, thereby realizing simple and high speed data processing and permitting an electronic computer to be used more efficiently.

According to one aspect of this invention, there is provided an information processor comprising an external memory for sequentially storing a plurality of records together with record positioning codes each interpolated between the adjacent records which each include a plurality of words arranged in series and word positioning codes each interpolated therebetween, a readout record designation means for designating a specified word of the record as a key word of read out condition and designating the condition of the designated key word content, a main memory for continuously reading out the records from the external memory to store the same in consecutive order while effecting address shift, an address memory for consecutively renewing and storing the heading address of each record to be written in the main memory, a collating means for collating the key word designated by the readout record designation means with said specified word when each record is written in the main memory, and means for returning the address of the main memory to the heading address stored in the address memory when the collating means has produced a signal representing incoincidence between the record and designated key word and writing a succeeding record in the main memory according to the address data stored in the address memory.

DETAILED DESCRIPTION OF PREFERRED EMBODIMENTS

Figure 1:
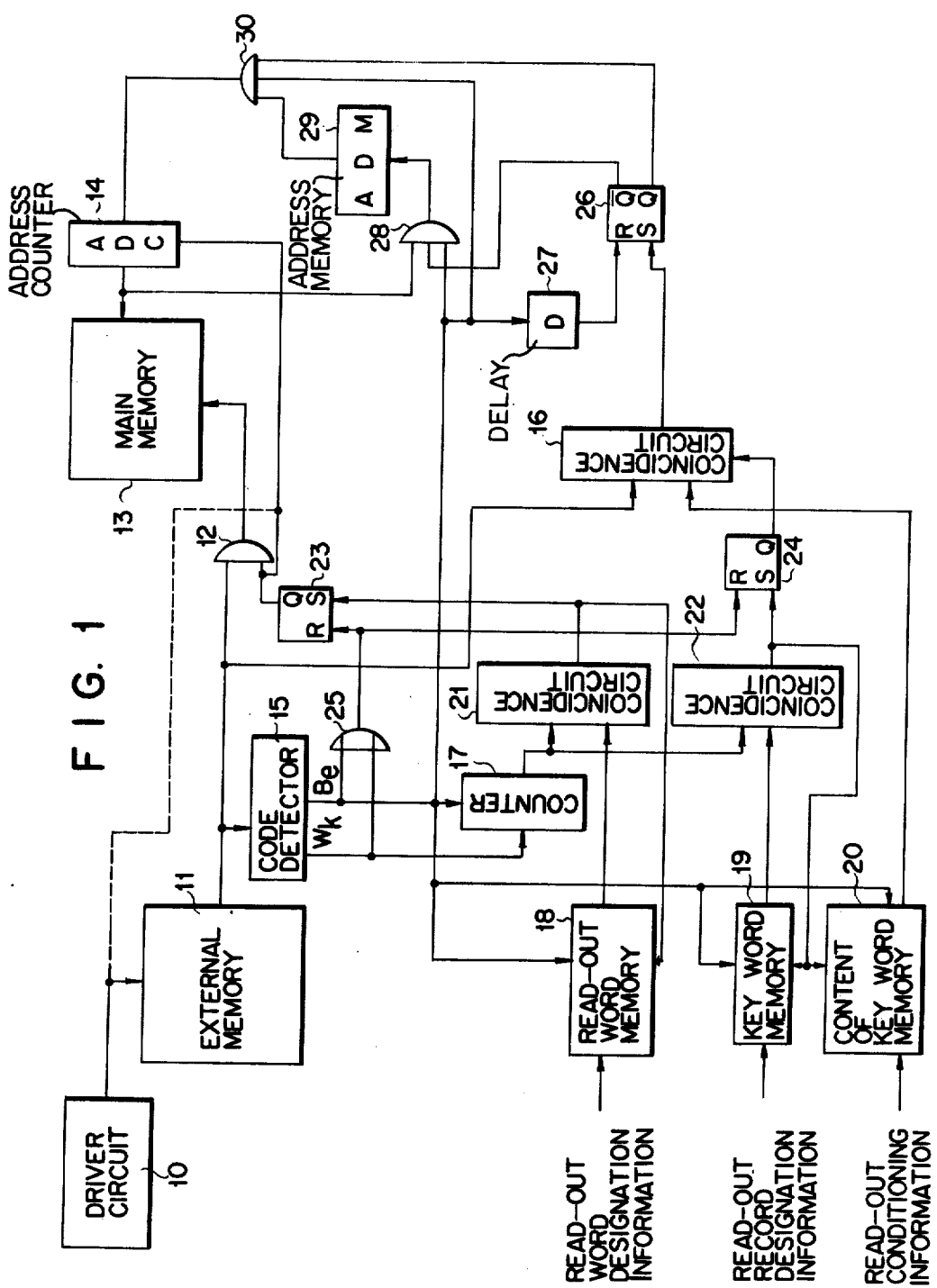
FIG. 1 is a block diagram illustrating an information processor according to one embodiment of this invention.
Figure 2:
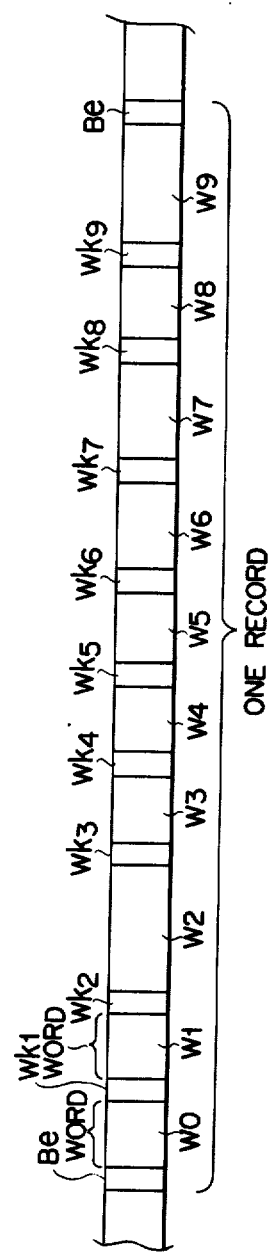
FIG. 2 illustrates a format illustrating an example of a record stored in an external memory in FIG. 1.

In FIG. 1, an external memory 11 is a memory of a large capacity such as a drum, disc and magnetic tape and is intended to sequentially store a plurality of records together with record positioning codes which each are interpolated between the adjacent records. Each record includes a plurality of words arranged alternately with word positioning codes. As shown in FIG. 2, data stored in the external memory 11 each have a plurality of record arranged in series and record positioning codes Be inserted between the adjacent record. Each of the record has a large number of word, for example, ten words W0 to W9 arranged in series and word positioning codes $Wk_1$ to $Wk_9$ inserted between the adjacent words. That is, the record read out from the external memory 11 is formed of the words W0 to W9 following a record positioning code Be and sequentially divided by the word positioning codes $Wk_1$ to $Wk_9$ and the readout of the record is completed at the next record positioning code Be. The record positioning code Be is placed at the front end of each record and records are sequentially read out in a manner as described above.

A record read out from the external memory 11 according to a readout command from a driver circuit 10 is supplied through an AND circuit 12 to a main memory 13 constituted by, for example, a random access memory and is written in the main memory 13 according to address designation by an address counter 14. The record read out from the external memory 11 is also supplied to a positioning code detector 15 for detecting word positioning codes Wk ($Wk_1$ to $Wk_9$) and record positioning codes Be which are special codes different from each of characters constituting word and having, for example, the same length as one character. The codes $Wk_1$ to $Wk_9$ are set equal to each other but denoted by different references as shown in FIG. 2 for clarifying the explanation. Moreover, the readout record is supplied to one input terminal of a coincidence circuit 16.

A detection signal of a record positioning code Be in the positioning code detector 15 is supplied as a reset command to a counter 17 and as a preset command to a readout word memory 18, key word memory 19 and a content of key word memory 20 to set the memories 18 to 20 to an initial state. The readout word memory 18 constitutes a readout word designation means and functions to store the word order of a record to be read out and extracted in response to a readout word designation input, for example, four data each representing numerals (2, 6, 7, 8) in FIG. 2 when it is required to extract third, seventh, eighth and ninth words W2, W6, W7 and W8. The key word memory 19 stores a key word order according to a readout record conditioning signal, for example, four data each representing numerals (0, 2, 5, 7) when first, third, sixth and eighth words of a record in FIG. 2 are determined to be a key word. The content of key word memory 20 constitutes a record designation means which stores data such as a customer code item and code item of the name of a person in charge which designate the content (0, 2, 5, 7) of the key word of a record according to a readout conditioning information input.

A detection signal for word positioning codes $Wk(Wk_1$ to $Wk_9)$ from the positioning code detector 15 is applied as a step signal to a counter 17 whose count signal is supplied to coincidence circuits 21 and 22 which also receive readout signals from a readout word memory 18 and a key word memory 19, respectively. A coincidence detection signal from the coincidence detector 21 is supplied as a readout data address shift command to the readout word memory 18 and is applied to a flip-flop circuit 23 to set the same. A coincidence detection signal from the coincidence detector 22 is applied as a readout data address shift command to the key word memory 19 and to the content of key word memory 20 and is applied as a set command to flip-flop circuits 23 and 24. The flip-flop circuits 23 and 24 are reset by an output signal of an OR circuit 25 receiving detection signals from the code detector 15 for detecting codes B$e$ and W$k$. When set, the flip-flop circuit 23 produces a gate signal from the output terminal Q to the AND circuit 12 and applies a step drive command to the address counter 14 functioning to designate an address of the main memory 13. The address counter 14 is stepped by clock pulses corresponding to data read out from the external memory 11 according to the step drive command and the content stepped of the counter 14 serves as address data to successively step and designate the addresses of the main memory 13 so as to store the data. A Q output signal from the flip-flop circuit 24 which is kept set is fed as a comparison command to the coincidence circuit 16. The coincidence circuit 16 compares the data read out from the external memory 11 and the condition determined by the data read out from the content of key word memory 20, and applies an output signal representing incoincidence of condition as a set command to the flip-flop circuit 26 when the comparison command is supplied from the flip-flop circuit 24. The flip-flop circuit 26 is reset by an output signal of a delay circuit 27 receiving the detection signal for the code B$e$ from the positioning code detector 15. An output signal from the output terminal $\overline{Q}$ of the flip-flop circuit 26, the detection signal for the code B$e$ and the count signal from the address counter 14 are coupled to input terminals of an AND circuit 28. An output signal of the AND circuit 28 representing the count of the address counter 14 is fed as write-in address data to an address memory 29. The set output signal from the flip-flop circuit 26 is applied to an AND circuit 30 together with the detection signal for the record positioning code B$e$ and an output signal of stored data from the address memory 29 and an address data having passed through the AND circuit 30 is applied to the address counter 14 as a rewrite address data.

There will now be described the operation of selectively storing in the main memory 13 required record of a plurality of records stored in the external memory 11. In this case, the readout word memory 18, coincidence circuit 21, flip-flop circuit 23 and AND circuit 12 in FIG. 1 are not necessary and stored in the external memory 11 is directly supplied to the main memory 13 according to a readout command from a driver circuit 10.

There will now be explained the operation of the information processor shown in FIG. 1.

When the required record is stored in the main memory 13 without being changed, the readout command from the driver circuit 10 is supplied as a step drive command to the address counter 14 through a signal line shown by dashed lines. The address counter 14 is stepped by clock pulses corresponding to the data read out from the external memory 11 according to the step drive command and stores the record read out from the external memory 11 in terms of the address data to be successively stepped as described above.

When a first record positioning code B$e$ shown in FIG. 2 is detected by the code detector 15, the counter 17 is reset by the B$e$ detection signal and at the same time the memories 19 and 20 are set to the respective initial states. At this time, if the flip-flop circuit 26 is reset, the content of the address counter 14 is written in the address memory 29 through the AND circuit 28 in terms of the B$e$ detection signal. When the first word W0 is read out from the external memory 11 a predetermined length of time after the record positioning code B$e$ was detected, a delay circuit 27 produces an output signal, resetting the flip-flop circuit 26. Simultaneously, the characters of the heading word W0 are successively address shifted and stored in the address position of the main memory 13. When the succeeding record positioning code B$e$ is detected by the code detector 15 after the whole record shown in FIG. 2 has been stored in the main memory 13 as described above, the B$e$ detection signal is fed to the AND gates 28 and 30. At this time, if the record stored in the main memory 13 includes a key word corresponding to the content of the readout record condition stored in the key word memory 19, the content of the counter 17 and the memory 19 coincide, with each other, causing the coincident circuit 22 to produce a set signal to the flip-flop circuit 24 which in turn applies a comparison command signal to the coincident circuit 16. If the content of the word designated as the key word of the records read out from the external memory 11 coincides with the readout conditioning stored in the content of key word memory 20, then the coincidence circuit 16 does not produce an incoincident output signal and so the flip-flop circuit 26 is kept reset. Accordingly, the gate of the AND circuit 28 is opened and the AND gate 30 is kept closed. Thus, the address memory 29 is enabled to newly store through the AND gate 28 the content of the address counter 14 obtained when the succeeding record positioning code B$e$ is detected.

On the other hand, when the content of the records read out from the external memory 11 is incoincident with the readout conditioning data stored in the content of key word memory 20, the coincident circuit 16 produces the output signal to set the flip-flop circuit 26, closing the AND gate 28 and opening the AND gate 30. As a result, the address data stored in the address memory 29 are fed to the address counter 14 through the AND gate 30 and the content of the counter 14 is returned to the heading address of the record which is finally stored in the main memory 13. Next the record item following the record positioning code B$e$ is read out and then the record is stored, instead of the stored record, in the address position following the returned address in the main memory 13.

Thus only the records whose content is coincident with the readout conditioning data and the readout record are continuously stored in consecutive order in the main memory 13.

There will now be explained the operation of selectively reading out from the main memory 13 only the words designated by the readout word from the records whose content coincides with the readout conditioning data and the readout record.

When the record shown in FIG. 2 are read out from the external memory 11, positioning code detector 15 produces a code Be detection signal in response to the first record positioning code Be to reset the counter 17 and preset the memories 18, 19 and 20 to an initial state. At the same time, flip-flop circuits 23, 24 and 26 are reset, the AND gate 12 is closed and the current address position of the address counter 14 is stored in the address memory 29. Each time the word is read out from the external memory 11, the word positioning code W$k$ from the code detector 15 is detected to step the counter 17. The count of the counter 17 is compared with the readout word and key word at the coincidence circuits 21 and 22. In this case, if key word (0, 2, 5, 7) is stored in the key word memory 19 as described before, the zero (0) data is supplied from the memory 19 to the coincidence circuit 22 in response to the preset command and when the counter 17 counts zero (0) or when the counter 17 detects the record positioning code Be and is reset, the flip-flop circuit 24 receives a set command supplied from the coincident circuit 22 to apply the comparison drive command to the coincident circuit 16. Accordingly, the coincident circuit 16 compares the word W0 read out after the record positioning code Be with the word read out from the content of key word memory 20, and when the word W0 coincides with the word, no output signal is produced. The memories 19 and 20 are shifted by one by the output from the coincident circuit 22 and are set so that they may produce the next key word 2 and the content of its key word condition. That is, the designated key word is derived together with the word read out from the external memory 11 and the contents of the key word are successively compared with the prescribed conditioning data by the coincidence circuit 16.

In parallel with the comparison operation described above, selection of a word to be derived is effected in the coincidence circuit 21. For example, if the data (2, 6, 7, 8) is stored in the readout word memory 18 as described before, two word positioning codes W$k_1$ and W$k_2$ are detected by the code detector 15, and when the counter 17 is stepped to 2 the coincidence detector 21 produces the coincidence output signal to set the flip-flop circuit 23 which in turn opens the AND gate 12 to step the address counter 14. Then, the second word data W$_2$ following the second word positioning code W$k_2$ is written in the main memory 13 according to the address designated by the address counter 14. When the operation of writing the word W$_2$ in the main memory 13 is finished and the word positioning code W$k_3$ is produced, the flip-flop circuit 23 is reset and the writing operation of the word W$_2$ is completed. At this time, the readout address of the readout word memory 18 is already stepped by the output signal of the coincidence circuit 21 and the memory 18 supplies a word order 6 data to be subsequently derived to the coincidence circuit 21. Thus, the sixth word positioning code W$k_6$ will be subsequently detected. Therefore, words designated by the readout word memory 18 are successively stored in the main memory 13 according to the address designation of the address counter 14.

That is, the operation of collating readout record with the key word is carried out in parallel with the operation of selecting and storing words to be derived, and when the word designated has the required conditioned content, the coincident circuit 16 does not produce incoincidence output signal and the operation mentioned above is continued without interruption.

However, when the content of the key word designated does not coincide with the required conditioning data, the detection of the incoincidence causes the flip-flop circuit 26 to be set. Accordingly, the readout record from the external memory 11 is completed, and when the record positioning code Be is detected by the code detector 15, the AND gate 30 is opened to replace the address position of the address counter 14 with the heading address of the record stored in the address memory 29. Thus, the preparation is made for processing words selected from the next record to be written. That is, the words in the record which is stored in the main memory 13 and is not designated will be automatically erased when next word is written in the corresponding position. Only the word specified from the record designated by the key word is stored in the main memory 13.

In the above explanation, when the content of the word read out from the external memory 11 coincides with the data stored in the content of key word memory 20, the word is allowed to be stored in the main memory 13. However, this invention is not limited to this, and there are many other ways to detect the required word in the record. For example, assume that the record item relates to the proceeds for each customer. The column of the proceeds may be designated as the designation word and the data representing "more than one hundred thousand yen" may be stored as the content of the word in the memory 20. Then, the content in the memory 20 may be compared with the content of the words read out from the external memory 11 by a comparison circuit to detect the word whose content corresponds to the data representing "more than one hundred thousand yen" and store the same in the memory 13.

In the embodiment described above, the same specified codes are used as the word positioning codes W$k_1$ to W$k_9$ which are successively applied to the counter 17. Thus, the counter 17 is stepped by the word positioning codes W$k_1$ to W$k_9$ to produce an output count representing what word positioning code is now supplied. However, the word positioning codes W$k_1$ to W$k_9$ can be formed of different codes so that the code supplied can be detected without the counter 17. In this case, each word positioning code can be formed of a length of one or more characters.

Thus, according to this invention, a number of records stored in the external memory are successively read out, and, without the necessity of reading out the same twice, the designated record or the designated word in the designated record can be selectively stored in the main memory in consecutive order. Therefore, the information processor according to this invention is capable of effecting the readout operation at a high speed under a simplified control and is effectively used with, for example, an electronic computer.

What is claimed is:

1. An information processor comprising:

an external memory (11) for storing a plurality of records which are arranged alternately with record positioning codes, each of said records including a plurality of words arranged alternately with word positioning codes;

a readout record designation means (19,20) for designating a key word based on which records to be read out are selected and for generating signals which indicate the designated key word;

a main memory (13) coupled to said external memory (11) for continuously reading out the records one by one from said external memory (11) to store the same in consecutive order while effecting address shift;

a comparison means (16) coupled to said external memory (11) and to said readout record designation means (19,20) for comparing the words in each record with the key word designated by said readout designation means when the record is written into said main memory (13); and a control means coupled to said comparison means for permitting, in accordance with the output from said comparison means, only the records selected by the key word to be stored into said main memory in consecutive order, said control means including:

a heading address memory (29) coupled to said main memory (13) for successively renewing and storing the address of said main memory (13) at which a heading character of each record to be stored into said main memory (13) is to be stored; and means (14,30) coupled to said comparison means (16), to said heading address memory (29) and to said main memory (13), and being responsive to said comparison means (16) for setting the address of said main memory (13) to act as the address stored in said heading address memory (29) when the record is found upon comparison not to coincide with the designated key word and for writing the next record into said main memory (13) from said address stored in said heading address memory (29).

2. An information processor according to claim 1 wherein said address setting means (14,30) comprises AND gate means (30) having inputs coupled at least to said heading address memory (29) and said comparison means (16); and an address counter (14) coupling said AND gate means (30) to said main memory (13).

3. An information processor according to claim 1 further comprising a readout word designation means (18) coupled to said readout record designation means (19,20) for designating a word to be read out of the record; and means (21, 23, 12) coupled to said readout word designation means (18) and to said main memory (13) for deriving only the designated words of the designated record and for writing same successively into said main memory (13).

4. An information processor according to claim 3 wherein said deriving means (21, 23, 12) comprises a second comparison means (21) coupled to said read out word designation means (18) and to an output derived from the output of said external memory (11); flip-flop means (23) coupled to an output of said second comparison means (21); and gating means (12) coupling said external memory (11) to said main memory (13) and being responsive to an output of said flip-flop means (23).

* * * * *